United States Patent [19]

Suys et al.

[11] 4,149,083

[45] Apr. 10, 1979

[54] RADIOGRAPHIC INTENSIFYING SCREENS

[75] Inventors: André R. Suys, Hove; Willy K. Van Landeghem, Sint-Gillis-Waas, both of Belgium

[73] Assignee: AGFA-GEVAERT N.V., Mortsel, Belgium

[21] Appl. No.: 775,520

[22] Filed: Mar. 8, 1977

[30] Foreign Application Priority Data

Mar. 18, 1976 [GB] United Kingdom ............... 10973/76

[51] Int. Cl.$^2$ ............................................... G01J 1/58

[52] U.S. Cl. ..................................... 250/486; 250/483

[58] Field of Search ................................ 250/486, 483

[56] References Cited

U.S. PATENT DOCUMENTS

| | | | |
|---|---|---|---|
| 2,144,040 | 1/1939 | Wurstlin | 250/486 |
| 3,872,309 | 3/1975 | DeBelder et al. | 250/486 |
| 3,936,644 | 2/1976 | Rabatin | 250/486 |
| 4,028,550 | 6/1977 | Weiss et al. | 250/486 |

*Primary Examiner*—Harold A. Dixon

*Attorney, Agent, or Firm*—A. W. Breiner

[57] ABSTRACT

An X-ray image intensifying screen comprising (1) a layer (which may be a supported layer or a self-supporting layer) containing fluorescent light-emitting phosphor particles including one or more rare-earth metal compounds and (2) a light-diffusing layer or sheet, which contains numerous discrete light-scattering volumes of a substance or substances distributed at random in a binder medium or partially embedded therein, such volumes having a mean size not larger than 20 $\mu$m, said layer or sheet being located so that fluorescent light of said phosphor particles can penetrate therethrough to the outside of said screen.

33 Claims, 3 Drawing Figures

RADIOGRAPHIC INTENSIFYING SCREENS

Figure 1:
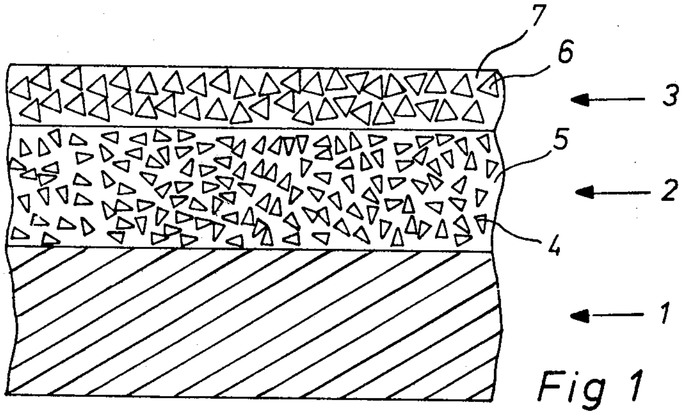

The present invention relates to a radiographic combination and method for the production of radiographs in which defects stemming from the use of particular radiation conversion screens are eliminated or substantially reduced.

Radiation conversion screens known as X-ray image intensifying screens containing fluorescent substances are employed for absorbing X-rays and converting said rays into light to which silver halide of a photographic material is more sensitive than to direct X-ray exposure. These screens are customarily arranged inside a cassette, so that each side of a silver halide film, emulsion-coated on both sides, after the cassette has been closed, is in intimate contact with an adjacent screen. In exposing the film the X-rays pass through one side of the cassette, through one entire intensifying (front) screen, through the light-sensitive silver halide film emulsion-coated on both sides and strike the fluorescent substances (phosphor particles) of the second (back) intensifying screen. This causes both screens to fluoresce and to emit fluorescent light into their adjacent silver halide emulsion layer, which is inherently sensitive or spectrally sensitized to the light emitted by the screens.

The commonly used fluorescent screens comprise a support and a layer of fluorescent particles dispersed in a coherent film-forming macromolecular binder medium. Normally a protective coating is applied on top of the fluorescent layer to shield said layer from ambient influeneces e.g. mositure, air, and mechanical abrasion.

It has been established experimentally that intensifying screens containing rare earth elements generally give rise even in the absence of penetrating radiation to local defects in the form of developable centres in the silver halide film when the film is in contact for a certain period with said screens. Upon development the film shows a number of tiny black spots.

Experiments have revealed that phosphors containing rare earth elements contain always traces of radioactive elements. Radioactive elements that probably cause the described defect seem to be radioactive decay products of the uranium (235) series and/or thorium series e.g. $Ac_{89}^{227}$, which is a $\beta$-ray emitter having a half-life of 22 years, and $Th_{90}^{227}$, which is an $\alpha$-ray emitter having a half-life of 18 days.

A radioactive rare earth metal isotope is e.g. $La^{138}$ emitting $\beta$-rays and $\gamma$-rays and having a half-life of $1.2\times10^{12}$ years (see Handbook of Chemistry and Physics, by Charles D. Hodgman, The Chemical Rubber Publishing Co., Cleveland, Ohio (1960) page 481).

The separation of said radioisotopes is very difficult and too costly for the present use in radiation conversion screens.

Whenever the phosphor particles are struck by radioactive radiation of the radioisotopes, fluorescent light is produced, which spotwise exposes the silver halide emulsion layer. On development black spots are obtained, which is particularly disturbing for the image quality.

The formation of black spots intensifies as the time passes. This is clearly demonstrated by an increased number of spots when a silver halide film has remained for several days in a cassette comprising screens that include rare earth metal phosphors with traces of radioactive elements. Most of the fluorescent radiation emitted under the influence of the radioactive desintegration in the interior of the phosphor layer is fortunately strongly scattered in the phosphor screen layer so that its input in an adjacent silver halide emulsion layer is substantially attenuated. Such is, however, not the case with the radioactive radiation and the fluorescent radiation emitted at or close to the surface of the phosphor layer.

It is one of the objects of the present invention to reduce or eliminate the above described defect.

In accordance with the present invention a radiographic combination is provided, which comprises at least one photographic silver halide emulsion material and at least one penetrating radiation intensifying screen, which contains, in a layer or sheet, phosphor particles that emit fluorescent light when struck by penetrating radiation and which has in its composition at least one rare-earth metal compound, wherein said combination comprises, between a silver halide emulsion layer of said photographic material and the layer or sheet containing said phosphor particles, a light-diffusing layer or sheet, which contains numerous discrete light-scattering volumes of a substance or substances distributed at random in a binder medium or partially embedded therein, said volumes having a mean size not larger than 20 $\mu$m.

By "penetrating radiation" we understand highly energetic radiation such as X-rays, $\gamma$-rays, neutrons, $\beta$-rays, and fast electrons, e.g. as obtained in an electron microscope.

In preferred embodiments of the invention, the light-diffusing layer or sheet is composed so that it does not reduce the speed by more than 50% as compared with an exposure in the absence of such light-diffusing layer or sheet.

Another optional but very important feature, resides in the composition of the light-diffusing layer or sheet so that the image resolution of the silver halide emulsion material expressed in terms of modulation transfer of 1 line pair per mm is reduced by not more than 10% as compared to the image resolution obtainable in the absence of such light-diffusing layer or sheet under identical X-ray exposure conditions.

The light-scattering character of the light-diffusing layer or sheet causes the light of the tiny low intensity fluorescent radiation spots produced by the radioactive traces in the phosphor particles close to the phosphor layer surface to be sufficiently dispersed in said light-diffusing layer or sheet and to be substantially prevented from spotwise directly exposing the silver halide emulsion layer in contact with the light-emitting side of said screen.

The invention includes a radiographic combination according to the invention as hereinbefore defined, wherein the light-diffusing layer or sheet is a layer or sheet containing numerous discrete light-scattering volumes of said substance or substances distributed at random in a binder medium or partially embedded therein, said substance or substances preferably having an index of refraction differing by at least 0.1 from the index of refraction of the binder medium. The difference in index of refraction is here determined at the same wavelength within the visible wavelength range.

The light-diffusing layer or sheet may have a patterned, irregular or other surface configuration, which randomly diffuses light.

The invention includes a penetrating radiation intensifying screen as such suitable for use in a radiographic combination as above defined, such screen incorporating a light-diffusing layer or sheet, preferably a layer or sheet composed so as to have one or more of the preferred characteristics hereinbefore described.

The present invention includes an X-ray image intensifying screen comprising (1) a layer (which may be a self-supporting layer) containing fluorescent light-emitting phosphor particles including one or more rare-earth metal compounds and (2) a light-diffusing layer or sheet located in such a position that fluorescent light of said phosphor particles can penetrate therethrough to the outside of the screen. The phosphor layer and the light-diffusing layer or sheet may be permanently joined to form parts of the same unit. The light-diffusing layer or sheet may have any of the composition characteristics hereinbefore described.

The present invention includes further a method for the production of radiographs, wich method comprises the information-wise exposure to penetrating radiation of said radiographic combination comprising at least one photographic silver halide emulsion material and at least one intensifying screen containing in a layer or sheet fluorescent light-emitting phosphor particles having in their composition at least one rare-earth metal compound, wherein said exposure is carried out in the presence of a light-diffusing layer or sheet situated between a silver halide emulsion layer of said photographic material and the layer or sheet containing said fluorescent light-emitting phosphor particles, said light-diffusing layer or sheet preferably having one or more of the characteristics hereinbefore described.

The thickness of said light-diffusing layer or sheet is preferably not more than 100 μm and is, e.g., in the range of 30 to 50 μm.

The substance or substances representing the light-scattering volumes may be solid, liquid or gaseous substances. The index of refraction of light-scattering volumes of a size more than 10 μm differs preferably at least 0.3 from the index of refraction of the binder medium.

When using such volumes that have an index of refraction not substantially different (<0.1) from the index of refraction of the binder medium preference is given to light-diffusing layers or sheets containing solid colloidal (size 1 μm to $10^{-3}$ μm) substances dispersed in the binder medium.

When particles having a size smaller than the wavelength of the fluorescent light are used the intensity of scattered light is proportional to the inverse fourth power of the wavelength. Scattering of this type is called "Rayleigh scattering." In the case of particles sizing 50 nm, blue light having half of the wavelength of red is scattered sixteen times more.

Preferred solid substances are those that are substantially transparent to the light emitted by the rare earth metal phosphor particles.

Examples of solid substances for use in the light-diffusing layer or sheet are listed in the following table 1.

Table 1

| Solid substance | mean particle size (μm) | Index of refraction (25° C. at 589 nm) |
|---|---|---|
| 1. $CaWO_4$ | 10-20 | 1.92 |
| 2. $TiO_2$ anatase | 5-10 | 2.55-2.49 |
| 2. $TiO_2$ rutile | 5-10 | 2.61-2.90 |
| 3. $SiO_2$ | 0.01—1 | 1.54 |

The solid substances included in the light-diffusing layer are preferably phosphor particles e.g. calcium tungstate particles with the proviso, however, that they are free from radioactive elements.

Suitable binding agents for use as carrier of said solid substances are listed in the following table 2 together with their index of refraction.

Table 2

| Binding agent | | Index of refraction at 25° C. (sodium line) 589 nm |
|---|---|---|
| 1. | Cellulose acetate butyrate —$COCH_3$ 14.4% by weight —$COCH_3H_7$ 36.1% by weight —OH 0.6% by weight | 1.47 |
| 2. | Poly(ethyl acrylate) | 1.465 |
| 3. | Copoly(vinyl chloride/ vinyl acetate/vinyl/alcohol (91/3/6 by weight) | 1.51 |
| 4. | Poly(n-butyl methacrylate) | 1.48 |

The present invention includes the use of different binding agents in combination and of different solid substances in admixture. The above solid substances and binding agents have been given for illustrative purpose only, without the intention to restrict the invention thereto.

According to a special embodiment the light-diffusing layer or sheet has a randomly patterned character by embossed parts or protruding particles. For example according to said embodiment solid substances are embedded only partially in the binder of the light-diffusing layer. They protrude to some extent and may act as minute light-diffracting bodies. For that purpose small glass or plastic pearls e.g. obtained through emulsion polymerisation may be used. A monolayer of said pearls forms already an effective light-diffusing layer for the purpose of the present invention. The average diameter of the embossed parts or of the protruding particles preferably should not be larger than 100 μm and the spatial frequency of said parts or particles is preferably at least 5 per mm in any direction along the surface.

According to another special embodiment the substance in the binder medium providing light-scattering is a gas forming tiny volume in the form of gas bubbles (e.g. bubbles of nitrogen) yielding a light-diffusing layer with vesicular structure. The gas bubbles act as light-scattering centres and provide to the light diffusing layer the desired character for reducing or eliminating the described defect.

In the production of a layer with randomly distributed minute gas bubbles use can be made of a diazonium compound incorporated in a suitable binder medium. During overall ultraviolet irradiation the diazonium compound releases minute amounts of nitrogen, which by subsequent heating expand to microscopic vesicules, which as a result of an index of refraction different from that of the binder medium are light-scattering.

Layers with vesicular structure can be prepared from gelatin, glue, or polyvinyl alcohol, in which a diazo compound has been incorporated. As an alternative for the diazo compound an organic azide compound can be used. The diazo or azide compound is dissolved or dispersed in a solution of the binder medium.

Vesicular material was developed by Kalvar Corp. for microfilm purposes and is marketed under the trade names KALVAR and KALVAFILM (see Light-Sensitive Systems, by Jaromir Kosar, John Wiley & Sons, Inc., New York—London—Sydney (1965) p. 276-282 and Microcopying Methods, by H. R. Verry, The Focal Press London and New York (1963) p. 85-86.

The KALVAR (trade name) vesicular film is useful as light-diffusing sheet in the method of the present invention. Said film has a good shelf life in processed state and is resistant to nuclear radiation in both the unexposed and exposed state. It is dimensionally stable and unaffected by water, light or heat up to 70° C.

In an intensifying screen of the present invention fluorescent light-emitting phosphor particles are contained, which particles are or include rare-earth metal compounds and contain preferably as host metal and/or as activator metal at least one element with atomic numbers 39 or 57 to 71. For example they contain yttrium, gadolinium, lanthanum or cerium as host metal and at least one of the metals of the group of terbium, europium, erbium, lutetium, cerium, dysprosium, thulium, samarium, ytterbium, holmium, and praseodymium as activator metal.

Particularly suitable are rare-earth oxysulphides and oxyhalides of lanthanum or gadolinium activated with at least one other rare-earth metal e.g. lanthanum, and gadolinium oxybromide and oxychloride activated with terbium or dysprosium, or thulium or terbium and ytterbium, and lanthanum and gadolinium oxysulphides activated with terbium, europium, or a mixture of europium and samarium. These rare-earth fluorescent materials have been described extensively in recent literature. Reference can be made in this respect e.g. to German Patent Specification No. 1,282,819 filed Mar. 18, 1966 by Radio Corp. of America, French Patent Specification Nos. 1,580,544 filed July 25, 1968 by Philips' Gloeilampenfabrieken N. V. and 2,021,397 filed Oct. 23, 1969 by General Electric Co, French Patent of Addition No. 94,579 filed June 5, 1968 to 1,473,531 filed Mar. 24, 1966 by Radio Corp. of America, U.S. Pat. No. 3,546,128 of Jacob G. Rabatin issued Dec. 8, 1970 and to K. A. Wickersheim et at "Rare-Earth Oxysulphide X-Ray Phosphors," IEEE Nuclear Science Symposium, San Francisco, Oct. 29-31, 1969 and to R. A. Buchanan IEEE Transactions on Nuclear Science, Feb. 1972, pages 81-83. These rare-earth photoluminescent materials, in particular the gadolinium and lanthanum oxysulphides and oxyhalides activated with other selected rare-earths e.g. erbium, terbium, and dysprosium, have a high X-ray "stopping power" or average absorption and high emission density and allow radiologists to use substantially lower X-ray dosage levels.

Practically suited phosphors for use in fluorescing intensification screens correspond to the following general formula:

$$M_{(w-n)} \cdot M'_n O_w X$$

wherein:

M is at least one of the metals yttrium, lanthanum, or gadolinium,

M' is at least one of the rare earth metals, dysprosium, erbium, europium, holmium, neodymium, praseodymium, samarium, terbium, thulium, or ytterbium, X is sulphur or halogen, n is 0.0002 to 0.2, and w is 1, when X is halogen, or is 2, when X is sulphur.

The preparation of fluorescent substances falling within the scope of said general formula has been described, e.g., in the French Patent Specification No. 1,580,544, already mentioned hereinbefore and in the U.S. Pat. Nos. 3,418,246 by Madin R. Royce and 3,418,247 by Perry N. Yocom, both issued Dec. 24, 1968.

A barium fluoride chloride emitting ultraviolet radiation and activated with europium (II) has been described in French Patent Specification No. 2,185,667 filed May 23, 1973 by Philips' Gloeilampenfabrieken N. V.

Particularly useful intensifying screens contain a phosphor or a phosphor mixture consisting wholly or mainly of a rare earth metal-activated lanthanum oxyhalide, said phosphor or phosphor mixture having more than half of its spectral emission above 410 nm, more than half of its spectral emission of visible light between 400 and 500 nm, and its maximum of emission in the wavelength range of 400–450 nm. Preferred phosphors of this class correspond to one of the following general formulaes:

$$La_{(1-n)}Tb_n^{3+}OX$$

wherein

X is halogen such as e.g. chlorine, bromine, or fluorine, and n is from 0.006 to 0.0001, the halogen preferably being present in an amount ranging between about the stoichiometric amount and about 2.5 percent deviating thereof; or $$La_{(1-w-y)}OX : Tb_w Yb_y$$

wherein

X is chlorine or bromine w is from 0.0005 to 0.006 mole of the oxyhalide, and y is from 0.00005 to 0.005 per mole of the oxyhalide.

Cerium may replace lanthanum in an amount described in the U.K. patent specification No. 1,247,602 filed Oct. 9, 1969 by General Electric Co.

Other useful lanthanum oxychloride or bromide phosphors are activated with thulium and are described in the U.S. Pat. No. 3,795,814 by Jacob G. Rabatin issued Mar. 5, 1974.

The preparation of terbium-activated lanthanum oxychloride and lanthanum oxybromide phosphors has been described e.g. in U.K. patent specification No. 1,247,602, already mentioned hereinbefore, French Patent Specification Nos. 2,021,398 and 2,021,399 both filed Oct. 23, 1969 by General Electric Co, and published German Patent Applications (DOS) Nos. 1,952,812 filed Oct. 21, 1969 and 2,161,958 filed Dec. 14, 1971 both by General Electric Co. Suitable lanthanum oxychloride-fluoride phosphors have been described in the published German Patent Application (DOS) No. 2,329,396 filed June 8, 1973 by Siemens A. G.

The preparation of lanthanum oxyhalides activated with terbium and ytterbium has been described, e.g., in the published German Patent Application (DOS) No. 2,161,958, already mentioned hereinbefore.

All of these phosphors contain traces of radioactive elements e.g. $La^{138}$, since it is difficult to separate the rare earth elements.

The particle size of the phosphors used in the present invention is preferably between 0.1 μm and about 20 μm, more preferably between 1 μm and 12μm. This range embodies about 80% by volume of the phosphor present in the intensifying screen.

The thickness of a supported fluorescent layer may vary within a broad range but is preferably in the range of 0.05 to 0.5 mm.

The coverage of the phosphors is e.g. in the range of about 200 to 800 g/sq.m and preferably about 300 to 600 g/sq.m.

The image sharpness obtainable with a fluorescent screen-silver halide material system can be improved considerably by incorporating a fluorescent light-absorbing dye called here "screening dye" into the fluorescent screen material, e.g. in the fluorescent layer or into a layer adjacent thereto e.g. in a subjacent anti-reflection layer. As the oblique radiation covers a large path in the screen material it is attenuated by the screening dye or dyes to a greater extent than the radiation impinging normally. The term "screening dye" includes dyestuffs (i.e. coloured substances in molecularly divided form) as well as pigments.

Diffuse radiation reflecting from the support of the fluorescent screen material can be mainly attenuated in an anti-reflection layer containing the screening dyes subjacent to the fluorescent layer.

The screening dye need not be removed from the fluorescent screen material and therefore may be any dye or pigment absorbing in the emission spectrum of the fluorescent substance(s). Thus a black substance such as carbon black pigment incorporated in said anti-reflection layer of the screen material yields quite satisfactory results.

The screening dye(s) is (are) preferably used in the fluorescent layer e.g. in an amount of at least 0.5 mg per sq.m. Their amount in the anti-reflection layer, however, is not limited.

An appropriate screening dye for use in the fluorescent screens emitting in the green part (500–600 nm) of the visible spectrum is, e.g., Neozapon Fire Red (C.I. Solvent Red 119), as azochromium rhodamine complex. Other suitable screening dyes are C.I. Solvent Red 8, 25, 30, 31, 32, 35, 71, 98, 99, 100, 102, 109, 110, 118, 124, and 130.

A non-self-supporting phosphor-binder composition may be coated on a wide variety of supports e.g. cardboard and plastic film e.g. polyethylene terephthalate film. The supports used in the fluorescent screens of the present invention may be coated with (a) subbing layer(s) for improving the adherence of the fluorescent coating thereto.

When a support is used for the fluorescent coating, it may serve as a light-diffusing sheet. According to this embodiment the support has a light-diffusing patterned surface and/or contains numerous discrete light-scattering volumes of a substance or substances distributed at random in a resin sheet or partially embedded therein the substance or substances having a mean particle size not larger than 20 μm and preferably having an index of refraction differing by at least 0.1 from the index of refraction of the binder medium constituting the continuous phase of the resin sheet.

In the method according to the present invention using an intensifying screen containing such support, the support faces the silver halide emulsion material during the exposure.

According to a special embodiment the outer face of the screen intended for contact with the photographic silver halide emulsion material contains a solid particulate material that has a static friction coefficient ($\mu$) at room temperature (20° C.) of less than 0.50 on steel.

The screens of the present invention may be used in conjunction with light-sensitive silver halide materials emulsion-coated on one or on both sides of the support.

Figure 2:
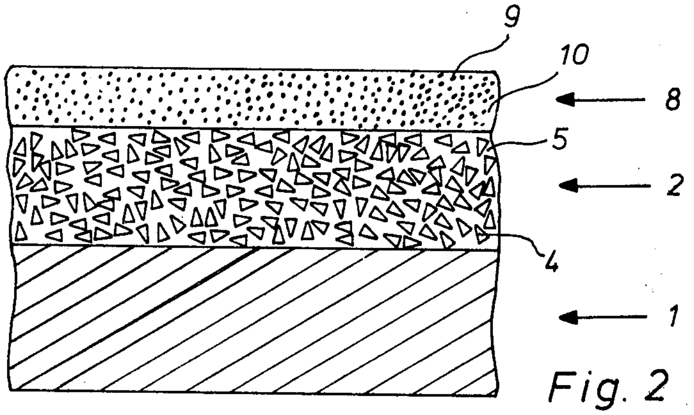
Figure 3:
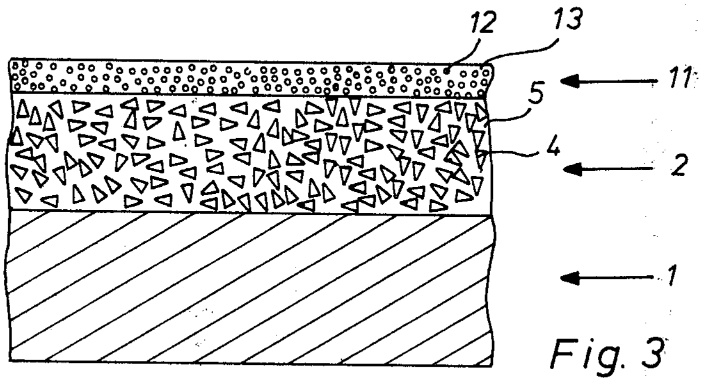

In the drawing,

FIGS. 1–3 illustrate different embodiments of the present invention wherein:

FIG. 1 is an X-ray image intensifying screen having a support 1, a phosphor layer 2, and a light-diffusing layer 3. The phosphor layer 2 contains phosphor particles 4 which are in rare-earth metal compounds dispersed in a binder 5. The light-diffusing layer 3 contains solid particles 6, e.g., calcium tungstate particles having a mean size more than 10 μm but not more than 20 μm and an index of refraction which differs by at least 0.3 from the index of refraction of the binder medium 7.

FIG. 2 is an X-ray image intensifying screen having the same support 1 and phosphor layer 2 as represented in FIG. 1. The light diffusing layer 8 contains randomly distributed colloidal solid substances 9, e.g., $SiO_2$ particles, having a particle size in the range of 1 μm to $10^{-3}$ μm in a binder 10.

FIG. 3 is an X-ray image intensifying screen having the same support 1 and phosphor layer 2 as represented in FIG. 1. The light-diffusing layer 11 contains randomly distributed gas bubbles 12 of a mean size not larger than 20 μm in a binder 13.

The following example illustrates the present invention without, however, limiting it thereto.

EXAMPLE

In a ball-mill lanthanum oxybromide activated with terbium was dispersed in a 28% by weight solution of poly-n-butyl methacrylate in toluene, the phosphor to binder ratio by weight being 8:1.

The ball-milling was effected till a grind was obtained with fineness 7 NS measured with an Hegman Grind Gage as specified in ASTM D 1210 (see Physical and Chemical Examination of Paints—Varnishes—Lacquers—Colors—Gardner & Sward 12th Ed. (1962) p. 243). The average particle size of the phosphor was about 7 μm.

After filtration and deaeration the resulting dispersion was coated on a polyethylene terephthalate support at a coverage of 400 g per sq.m of said lanthanum oxybromide phosphor.

In the same way as described with respect to the lanthanum oxybromide phosphor a calcium tungstate dispersion was made. This dispersion containing calcium tungstate particles of an average size of 7 μm was coated on the lanthanum oxybromide phosphor layer at a coverage of 200 g per sq.m.

An intensifying screen A containing only said lanthanum oxybromide layer and a screen B containing said lanthanum oxybromide layer covered with said calcium tungstate layer were used in a comparative test.

Distinct cassettes were loaded with the screens A and B sizing 24×30 cm, each together with a medical radiographic film CURIX RP1 PE (CURIX is a registered trade mark of the Applicant). The screens were kept in contact with the films at room temperature conditions for 72 h.

Under darkroom conditions each cassette was opened and half of each film shielded with a lead plate. The partwise shielded films in contact with their screens were then exposed to a same X-ray dose. In order to determine lateron the modulation transfer of the radiographic combination a part of the combination which was not shielded by the lead foil was exposed through a test target. Said test target consisted of a line screen of lead wherein the width of the screen bars gradually diminished and their spatial frequency (number per mm) gradually increased from one side of the test target to the other. At 80 kV peak a series of exposures was given in order to get densities on the film from fog level up to maximum density.

The films were then developed in an automatic 90 seconds processing machine. The development lasted 23 seconds at 35° C. in Agfa-Gevaert's hardening developer G 138, which comprises hydroquinone and 1-phenyl-3-pyrazolidone as developing agents and glutaraldehyde as a hardener.

The speed difference ΔS of the film-screen A combination with respect to the film-screen B combination is calculated on the basis of the formula $S=5-\log_{10} E$ wherein E is the X-ray dose at 80 kV peak needed to reach a silver image density of 1.00 above the inherent fog density of the material.

The difference in speed (ΔS) between radiographic film-screen A combination and the combination with screen B was 0.06.

The modulation transfer (MT) value expressed in percent (%) at 1 line pair per mm being a reliable indication of the image resolution possibility of the screen-film combinations was determined.

The film-screen A combination offered a MT value of 55%, the film-screen B combination a MT value of 51% thus proving that the light-diffusing layer essentially consisting of calcium tungstate had no considerable influence on the image sharpness.

On the parts of the film that had not been shielded by the lead foil during the X-ray exposure, the black spots were counted by inspection through a magnifying glass (enlargment 5×). The spots were counted in 10 squares of 1 cm2. The average number of these 10 countings was considered to be representative of the whole surface.

The film-screen A combination gave 5 spots per sq.cm, whereas the film-screen B combination showed to be free from spots. Such is a clear proof of the effectiveness of said light-diffusing calcium tungstate layer in the counteracting of black spot formation arising in connection with rare earth phosphor screens.

We claim:

1. A radiographic combination comprising at least one photographic silver halide emulsion material and at least one X-ray image intensifying screen, said screen comprising (1) a layer containing fluorescent light-emitting phosphor particles including at least one rare-earth metal compound and (2) a light-diffusing layer which contains numerous discrete light-scattering volumes of at least one substance distributed at random in a binder medium, said layer being located so that fluorescent light of said phosphor particles can penetrate therethrough to the outside of said screen, wherein (i) the light-diffusing layer is composed so that it does not reduce the fluorescent light-emission by more than 50 percent as compared with an X-ray exposure in the absence of such light-diffusing layer, (ii) the light-diffusing layer is composed so that the image resolution of the silver halide emulsion material expressed in terms of modulation transfer of 1 line pair per mm is reduced by not more than 10 percent as compared to the image resolution obtainable in the absence of such light-diffusing layer under identical X-ray exposure conditions, and (iii) the substance representing said volumes have a mean size more than 10 μm but not larger than 20 μm and an index of refraction which differs by at least 0.3 from the index of refraction of the binder medium in which said volumes are distributed.

2. The radiographic combination of claim 1 wherein said layer containing fluorescent light-emitting phosphor particles is a self-supporting sheet and said light-diffusing layer is a self-supporting sheet.

3. The radiographic combination of claim 1 wherein said phosphor particles comprise more than one rare-earth metal compound and said light-scattering volumes are of more than one substance.

4. The radiographic combination of claim 1 wherein said volumes are represented by light-scattering solid non-phosphor particles.

5. The radiographic combination according to claim 4 wherein said solid non-phosphor particles are substantially transparent to the light emitted by the rare-earth metal phosphor particles.

6. The radiographic combination according to claim 1 wherein said volumes are represented by phosphor particles that are free from rare-earth metals and radioactive elements.

7. The radiographic combination according to claim 6 wherein said particles are calcium tungstate particles.

8. The radiographic combination according to claim 1 wherein the phosphor particles including at least one rare-earth metal compound containing as host metal and/or as activator metal at least one element with atomic number 39 or 57 to 71.

9. The radiographic combination according to claim 8 wherein said phosphor particles are rare-earth oxysulphide or oxyhalide particles of lanthanum or gadolinium activated with at least one other rare-earth metal.

10. The radiographic combination according to claim 9 wherein the activator metal is terbium.

11. The radiographic combination according to claim 1 wherein the light-diffusing layer or sheet has a thickness not more than 100 μm.

12. A radiographic combination comprising at least one photographic silver halide emulsion material and at least one X-ray image intensifying screen, said screen comprising (1) a layer containing fluorescent light-emitting phosphor particles including at least one rare-earth metal compound and (2) a light-diffusing layer which contains numerous discrete light-scattering volumes of at least one substance distributed at random in a binder medium, said layer being located so that fluorescent light of said phosphor particles can penetrate therethrough to the outside of said screen, wherein (i) the light-diffusing layer or sheet is composed so that it does not reduce the fluorescent light-emission by more than 50 percent as compared with an X-ray exposure in the absence of such light-diffusion layer, (ii) the light-diffusing layer is composed so that the image resolution of the silver halide emulsion material expressed in terms of modulation transfer of 1 line pair per mm is reduced by not more than 10 percent as compared to the image resolution obtainable in the absence of such light-diffusing layer under identical X-ray exposure conditions, and (iii) the substance or substances are solids of a colloidal size in the range of 1 μm to $10^{-3}$ μm.

13. The radiographic combination of claim 12 wherein said layer containing fluorescent light-emitting phosphor particles is a self-supporting sheet and said light-diffusing layer is a self-supporting sheet.

14. The radiographic combination of claim 12 wherein said phosphor particles comprise more than one rare-earth metal compound and said light-scattering volumes are of more than one substance.

15. The radiographic combination of claim 12 wherein said solids have an index of refraction differing by at least 0.1 from the index of refraction of the binder medium.

16. The radiographic combination of claim 12 wherein said solids have an index of refraction differing by not more than 0.1 from the index of refraction of the binder medium.

17. The radiographic combination of claim 12 wherein the solids of colloidal size are $SiO_2$-particles.

18. The radiographic combination of claim 12 wherein the phosphor particles including at least one rare-earth metal compound contains as host metal and-/or activator metal at least one element with atomic number 39 or 57 to 71.

19. The radiographic combination of claim 18 wherein the phosphor particles are rare-earth oxysulphide or oxyhalide particles of lanthanum or gadolinium activated with at least one other rare-earth metal.

20. The radiographic combination of claim 19 wherein the activator metal is terbium.

21. The radiographic combination of claim 12 wherein the light-diffusing layer has a thickness not more than 100 $\mu$m.

22. A radiographic combination comprising at least one photographic silver halide emulsion material and at least one X-ray image intensifying screen, said screen comprising (1) a layer containing fluorescent light-emitting phosphor particles including one or more rare-earth metal compounds and (2) a light-diffusing layer which contains numerous discrete light-scattering volumes of a substance or substances distributed at random in a binder medium, said layer being located so that fluorescent light of said phosphor particles can penetrate therethrough to the outside of the screen, wherein (i) the light-diffusing layer is composed so that it does not reduce the fluorescent light-emission by more than 50 percent as compared with an X-ray exposure in the absence of such light-diffusing layer, (ii) the light-diffusing layer is composed so that the image resolution of the silver halide emulsion material expressed in terms of modulation transfer of 1 line pair per mm is reduced by not more than 10 percent as compared to the image resolution obtainable in the absence of such light-diffusing layer under identical X-ray exposure conditions, and (iii) the volumes have a mean size not larger than 20 $\mu$m and are gas bubbles.

23. The radiographic combination of claim 22 wherein said layer containing fluorescent light-emitting phosphor particles is a self-supporting sheet and said light-diffusing layer is a self-supporting sheet.

24. The radiographic combination of claim 22 wherein said phosphor particles comprise more than one rare-earth metal compound and said light-scattering volumes are of more than one substance.

25. The radiographic combination of claim 22 wherein the gas is nitrogen.

26. The radiographic combination of claim 22 wherein the phosphor particles including at least one rare-earth metal compound contains as host metal and-/or activator metal at least one element with atomic number 39 or 57 to 71.

27. The radiographic combination of claim 26 wherein the phosphor particles are rare-earth oxysulphide or oxyhalide particles of lanthanum or gadolinium activated with at least one other rare-earth metal.

28. The radiographic combination of claim 27 wherein the activator metal is terbium.

29. The radiographic combination of claim 22 wherein the light-diffusing layer or sheet has a thickness not more than 100 $\mu$m.

30. An X-ray image intensifying screen comprising (1) a layer containing fluorescent light-emitting phosphor particles including at least one rare-earth metal compound and (2) a light-diffusing layer which contains numerous discrete light-scattering volumes of at least one substance distributed at random in a binder medium wherein the light-scattering volumes have an index of refraction not more than 0.1 different from the index of refraction of the binder medium and are of colloidal size in the range of 1 $\mu$m to $10^{-3}$ $\mu$m, said layer being located so that fluorescent light of said phosphor particles can penetrate therethrough to the outside of said screen.

31. An X-ray image intensifying screen comprising (1) a layer containing fluorescent light-emitting phosphor particles including at least one rare-earth metal compound and (2) a light-diffusing layer which contains numerous discrete light-scattering volumes in the form of tiny gas bubbles distributed at random in a binder medium, said volumes having a mean size not larger than 20 $\mu$m and said layer being located so that fluorescent light of said phosphor particles can penetrate therethrough to the outside of said screen.

32. The screen of claim 31 wherein the gas is nitrogen.

33. A method for the production of radiographs including the step of information-wise exposing to penetrating radiation a radiographic combination comprising at least one photographic silver halide emulsion material and at least one intensifying screen, which combination contains in a layer or sheet fluorescent light-emitting phosphor particles having in their composition at least one rare-earth metal compound, wherein said exposure is carried out in the presence of a light-diffusing layer or sheet situated between a silver halide emulsion layer of said photographic material and the layer or sheet containing said fluorescent light-emitting phosphor particles, said light-diffusing layer or sheet containing numerous discrete light-scattering gas bubbles of a substance or substances distributed at random in a binder medium or partially embedded therein, the gas bubbles having a mean size not larger than 20 L$\mu$m.

* * * * *